United States Patent [19]

Clark

[11] Patent Number: 5,544,697

[45] Date of Patent: Aug. 13, 1996

[54] DIFFERENTIAL TEMPERATURE CONTROL

[75] Inventor: William E. Clark, Syracuse, N.Y.

[73] Assignee: Carrier Corporation, Syracuse, N.Y.

[21] Appl. No.: 125,919

[22] Filed: Nov. 27, 1987

Related U.S. Application Data

[62] Division of Ser. No. 91,370, Aug. 26, 1987, Pat. No. 4,890,666, which is a continuation of Ser. No. 762,002, Aug. 2, 1985, abandoned, which is a continuation-in-part of Ser. No. 691,730, Jan. 16, 1985, Pat. No. 4,533,080, which is a continuation of Ser. No. 528,813, Sep. 2, 1983, abandoned.

[51] Int. Cl.$^6$ .................................................. F25B 29/00
[52] U.S. Cl. ........................ 165/209; 165/255; 236/49.3; 236/1 B; 236/1 C
[58] Field of Search ............................ 236/49, 1 B, 1 C; 165/22, 12, 2

[56] References Cited

U.S. PATENT DOCUMENTS

| | | | |
|---|---|---|---|
| 3,140,047 | 7/1964 | Holloway | 236/1 C |
| 3,167,253 | 1/1965 | Church et al. | |
| 3,450,342 | 6/1969 | Arledge, Jr. | 236/1 C |
| 3,568,760 | 3/1971 | Hogel | 165/22 |
| 3,724,534 | 4/1973 | Weatherson | 165/12 |
| 3,814,173 | 6/1974 | Coon | 165/22 |
| 4,009,825 | 3/1977 | Coon | 165/22 |
| 4,136,732 | 1/1979 | Demaray et al. | 165/22 |
| 4,182,484 | 1/1980 | Stanke et al. | 236/49 |
| 4,406,397 | 9/1983 | Kamata et al. | 236/49 |
| 4,487,363 | 12/1984 | Parker et al. | 236/49.3 |
| 4,530,395 | 7/1985 | Parker et al. | 165/22 |
| 4,533,080 | 8/1985 | Clark et al. | 236/49 |
| 4,553,696 | 11/1985 | Ichikawa et al. | 236/49 |
| 4,646,964 | 3/1987 | Parker et al. | 165/11.1 |

OTHER PUBLICATIONS

Key systems for Commercial Buildings, Carrier Corp publication form 33DS–1PD, 1986, pp. 1–45.

*Primary Examiner*—John K. Ford

[57] ABSTRACT

The difference between the zone temperature and the scheduled setpoint, or $\Delta t$, is the basic data from each zone. Communication between the air handler control and the air terminal control is provided via the air system control so that the system is temperature, rather than pressure, responsive.

16 Claims, 11 Drawing Sheets

DIFFERENTIAL TEMPERATURE CONTROL

This application is a division of application Ser. No. 091,370, filed Aug. 26, 1987, now U.S. Pat. No. 4,890,666 which is a continuation of Ser. No. 762,002 filed on Aug. 2, 1985, abandoned, which is a continuation in part of application Ser. No. 691,730 filed Jan. 16, 1985, now U.S. Pat. No. 4,533,080, which is a continuation of application Ser. No. 528,813 filed on Sep. 2, 1983 and now abandoned.

BACKGROUND OF THE INVENTION

In conventional variable air volume (VAV) systems which are capable of variable output by varying the fan speed, positioning the inlet guide vanes or by controlling the pitch of an axial fan, fan control is achieved through the use of a single pressure sensor which is located somewhere in the main duct line. The pressure sensor sends an input directly to the fan control, such as a variable speed drive of an air handler unit, to cause the speed to increase, decrease or remain constant. Thus, if the pressure at the sensor location is too high, a "decrease" signal is sent and, if it is too low, an "increase" signal is sent. The location of the sensor is carefully chosen in order that the pressure sensed is most closely representative of the overall system pressure distribution over the whole load range. Ordinarily, the sensor location chosen is about two thirds of the way down the main duct as measured by distance or total pressure drop. The space temperatures are not used to control fan speed. Instead, the sensed pressure is fed back to the speed changer through a parallel summing junction/function generator control process. The speed changes alter fan speed and thereby fan outlet pressure. There is a pressure loss in the remaining main/common duct downstream of the pressure sensor. The duct system splits up the flow, losing more pressure in the branches, and the air is delivered to a VAV terminal control loop which imposes a controlled pressure loss and ultimately influences the space temperature. Thus, although temperature is the variable to be controlled, all of the controls are pressure responsive, and a single pressure sensor is used. So, even if the pressure sensor is located at the point where the sensor will give the "best" representation of the overall duct pressure distribution at design flow, when there is off .design flow and when the VAV terminals on one side of the duct system close off, however, the "best" spot changes to another location. As a result, the sensor may be inaccurate in its representation of duct pressure distribution under off-design conditions as well as those due to normal changes during the day.

Additionally, the sensed pressure provides an indirect communication between the air handler and the terminals in the sense that the air handler is operated in response to the sensed pressure and the sensed pressure is influenced by the terminals as they open and close to control the air flow and thereby the temperature in the zones. Since temperature data is not directly communicated, the operation of the system can be in an undesirable manner. For example, ventilation requirements in a zone may cause it to be overheated or overcooled.

Although the interior zones of a building are essentially isolated from seasonal temperature changes, sunload, etc., there are still variables in the cooling load due to people leaving their work areas and/or congregating for meetings, etc. Also, the cooling load is dependent upon the heat produced by lighting, equipment and personnel. Overnight, during vacations, etc., overcooling may be caused even where air is supplied at minimum ventilation requirements. As a result, it may be necessary to provide a "warmup" in the morning even though there is only a cooling load during occupancy. Similarly, it is undesirable to heat unoccupied areas such as unused offices.

SUMMARY OF THE INVENTION

The present invention uses the difference between the zone temperature and the scheduled setpoint, or $\Delta t$, as the basic data from each zone. This data is used to operate the system which controls communication and operates between the air handler control and the air terminal controls for the various zones. Initially, the space temperatures of all of the control zones are sensed to determine whether the system should be in the heating or cooling mode. This, of course, is dependent upon current scheduled set points which could be the night set back temperature, normal heating, unoccupied heating, normal cooling, or start up cooling. The basic zone temperature data can be used for several other functions once the mode has been determined such as controlling the air handler fan in the cooling mode for energy conservation purposes and to prevent overcooling in the heating mode the basic zone temperature data is used to reset the supply air temperature up, as necessary, at minimum fan speed to maintain space conditions. It will also increase fan speed when maximum supply air temperature is inadequate to maintain space conditions as would be the case where a low temperature heat pump source is used.

When the air handler fan is at the minimum desirable speed, 50%, to conserve fan energy but still at sufficient speed/flow to provide adequate fresh air and/or air circulation, the zone temperature can continue to decrease causing over cooling. The basic zone temperature data is used again in the air system control. The air system control resets the air handler supply air temperature up so that fresh air and circulation are maintained. A small percentage of unsatisfied zones is used as an operating strategy. Action takes place when this small percentage is exceeded in either direction, otherwise there is a dead band where no change is called for.

The individual zone air terminals have a variable air volume (VAV) control mode to satisfy space temperature. All of the air terminals or air terminal controls supplied by one air handler will be in either the direct acting mode for cooling or the reverse acting mode for heating. The air system control will determine which mode the system should be in and transmit this data back to the air terminal controls. Each air terminal and control will operate in a VAV mode for heating and cooling to try and satisfy the basic scheduled zone temperature requirement. Thus, the present invention does not replace the air handler control or the air terminal control but, if they are compatible, ties them together and feeds all of the temperature data to the air handler control.

It is an object of this invention to control the interrelated air side functions of an air terminal/air handler system in any energy conserving manner while controlling zone space air temperatures.

It is another object of this invention to provide space temperature control and air system balancing without producing a noticeable sound change.

It is an additional object of this invention to provide minimum fresh air and circulation while preventing overcooling.

It is another object of this invention to balance the air terminal on pull down such that pull down rates are not controlled by the distance from the air handler.

It is a further object of this invention to provide an air control system which does not require air flow sensors or pressure sensors for control.

It is an additional object of this invention to provide control based upon zone thermal priority rather than duct pressure availability in the air distribution system. These objects, and others as will become apparent hereinafter, are accomplished by the present invention.

Basically, the rate of change/pull down to balance the system is limited to prevent noticeable changes as to the sound level and the temperature difference, $\Delta t$, between the zone set point and the actual space temperature is used as the basis for control. The control functions can include: (1) space temperature control; (2) the prevention of noticeable sound change; (3) air system balancing; (4) minimum system air flow control; (5) minimum energy fan volume control; (6) prevention of fan motor overload; (7) change over between cooling and heating; and, (8) remote space temperature monitoring and reset.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENT

Figure 1:
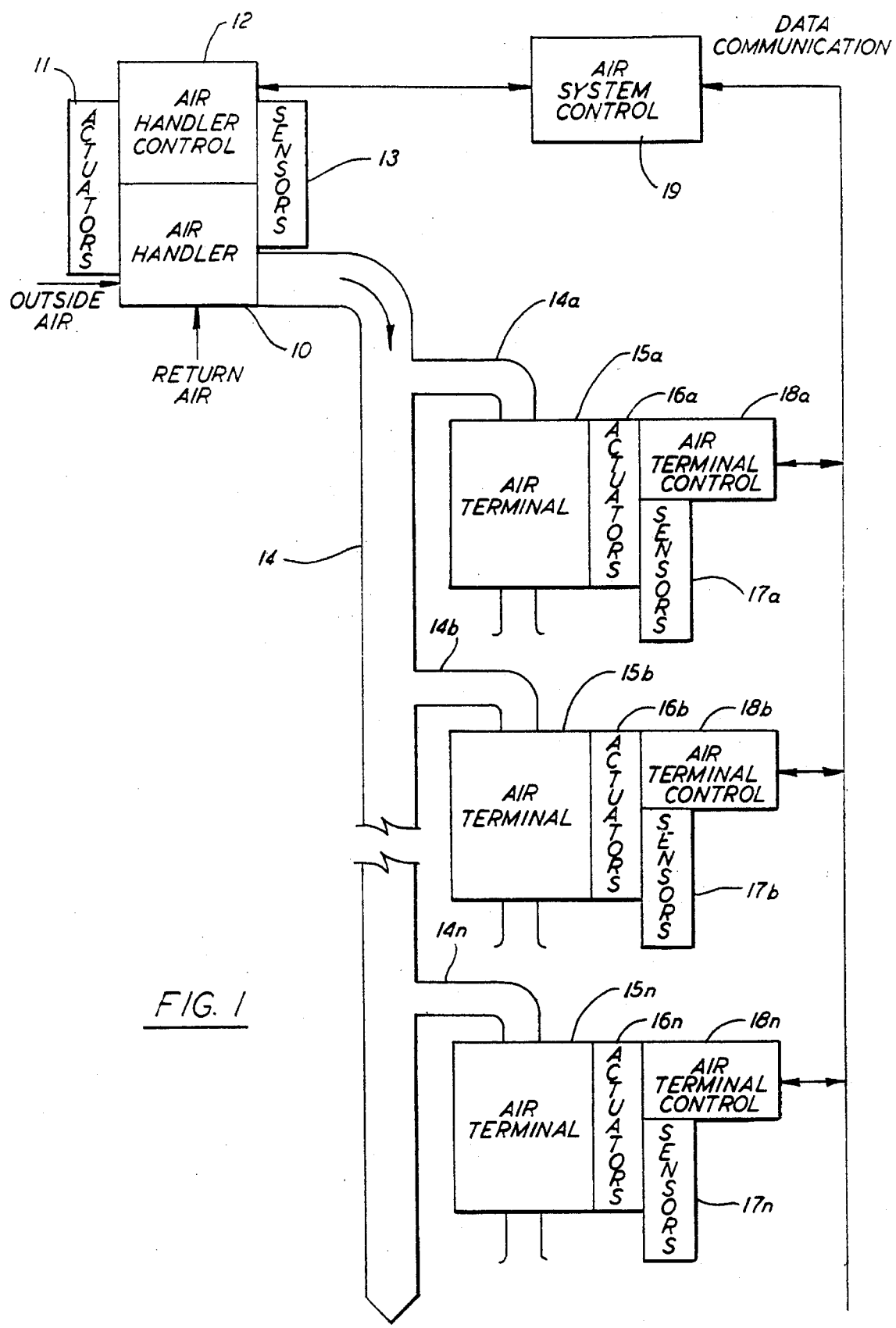
FIG. 1 is a schematic representation of an air system employing the present invention.

In FIG. 1, the numeral 10 generally designates the air handler which includes a fan, coil(s) and an electric or hot water heater. The air handler 10 receives return air and/or outside air which it delivers to duct 14. Actuators 11 control the outside and return air dampers for controlling the amounts of return and/or outside air. The air handler control 12 controls the air handler 10 by controlling the fan speed, coil(s) and heater, as is conventional. Sensors 13 detect the supply air temperature and fan motor power The conditioned air supplied to duct 14 is, in turn, supplied to branch lines 14a–n which supply terminals 15a–n, respectively. Terminals 15a–n are of the inflatable bellows damper type in which plenum air is used to inflate, and thereby close, the bellows and to deflate, and thereby open, the bellows. Actuators 16a–n control the inflation of the bellows as is well known in the art. Sensors 17a–n, respectively, sense the space temperature and the set point which provides the $\Delta t$ information for each space or zone and which is supplied to air terminal controls 18a–n, respectively. Air terminal controls 18a–n contain the logic for controlling the actuators 16a–n based upon the space temperature data supplied by sensors 17a–n. Air terminal controls 18a–n do not know when to change over between heating and cooling. Since the cooling control is direct acting and the heating control is reverse acting, the logic must be reversed in going between heating and cooling.

Figure 2:
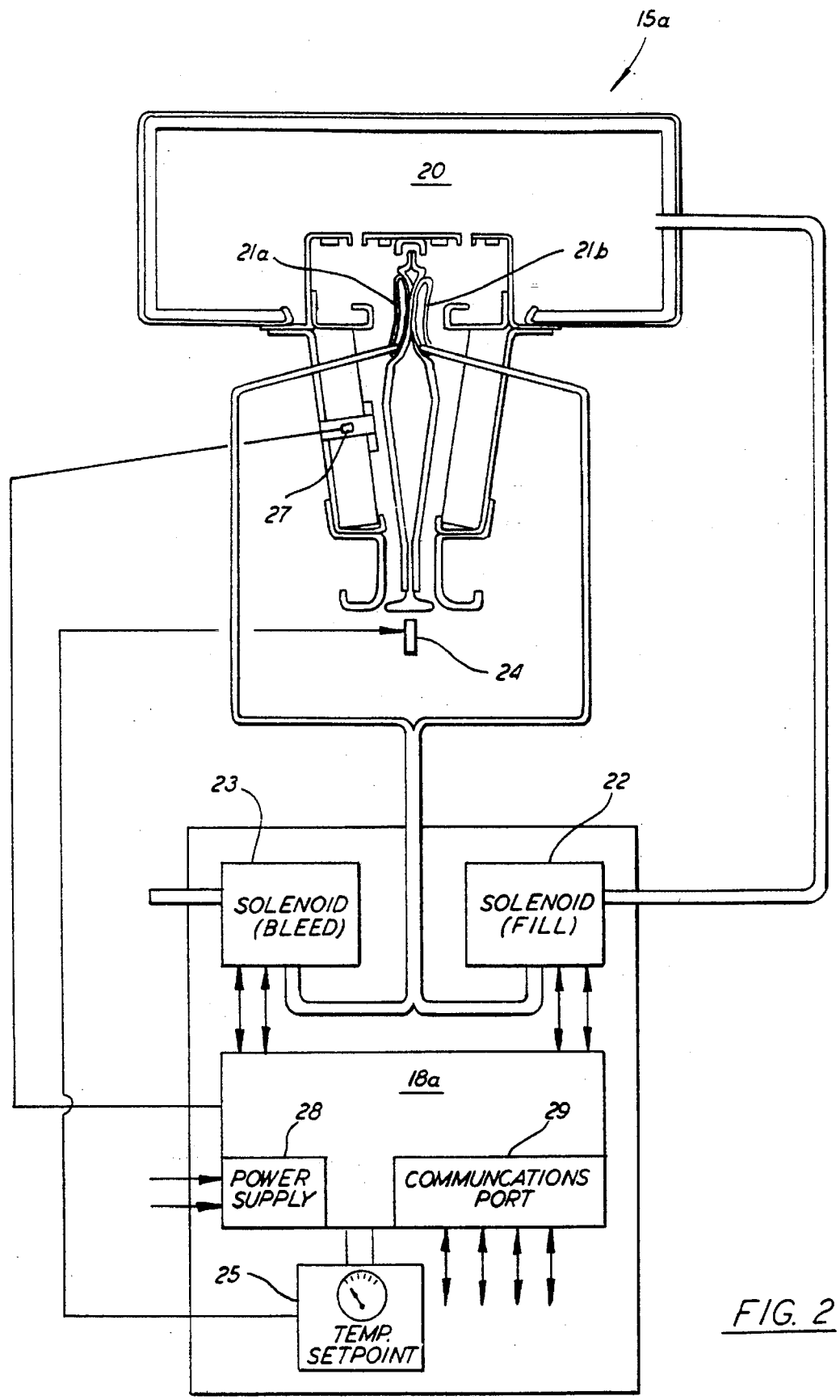
FIG. 2 is a schematic representation of the structure of a single terminal.

Referring now specifically to FIG. 2 for the details of exemplary air terminal 15a, line 14a supplies air to plenum 20. Air flows from plenum 20 under the control of bellows 21a and b. Actuators 16a include solenoid 22 which controls the filling or inflation of the bellows 21a and b and solenoid 23 which controls the bleeding or exhausting of bellows 21a and b. Sensors 17a includes either integral room temperature sensor 24 or a remote temperature sensor (not illustrated) and the temperature setpoint structure 25, and, if used, velocity sensor 27. The air terminal control 18a would include a power supply 28 and a communications port 29. Communications port 29 would send the room temperature and setpoint data to air system control 19 and would receive reset temperature signals as for night setback and conservation strategies as well as signals for indicating a changeover in response when going between heating and cooling.

Air system control 19 provides data communication to air handler control 12 and air terminal controls 18a–n. In this way air terminal controls 18a–n are told when to change over to the other logic when changing between heating and cooling, when, and how much, to open/close the terminals 15a–n, etc. The air handler control 12 receives information as to how far to reset the coil temperature, whether to change fan speed, etc.

Figure 3:
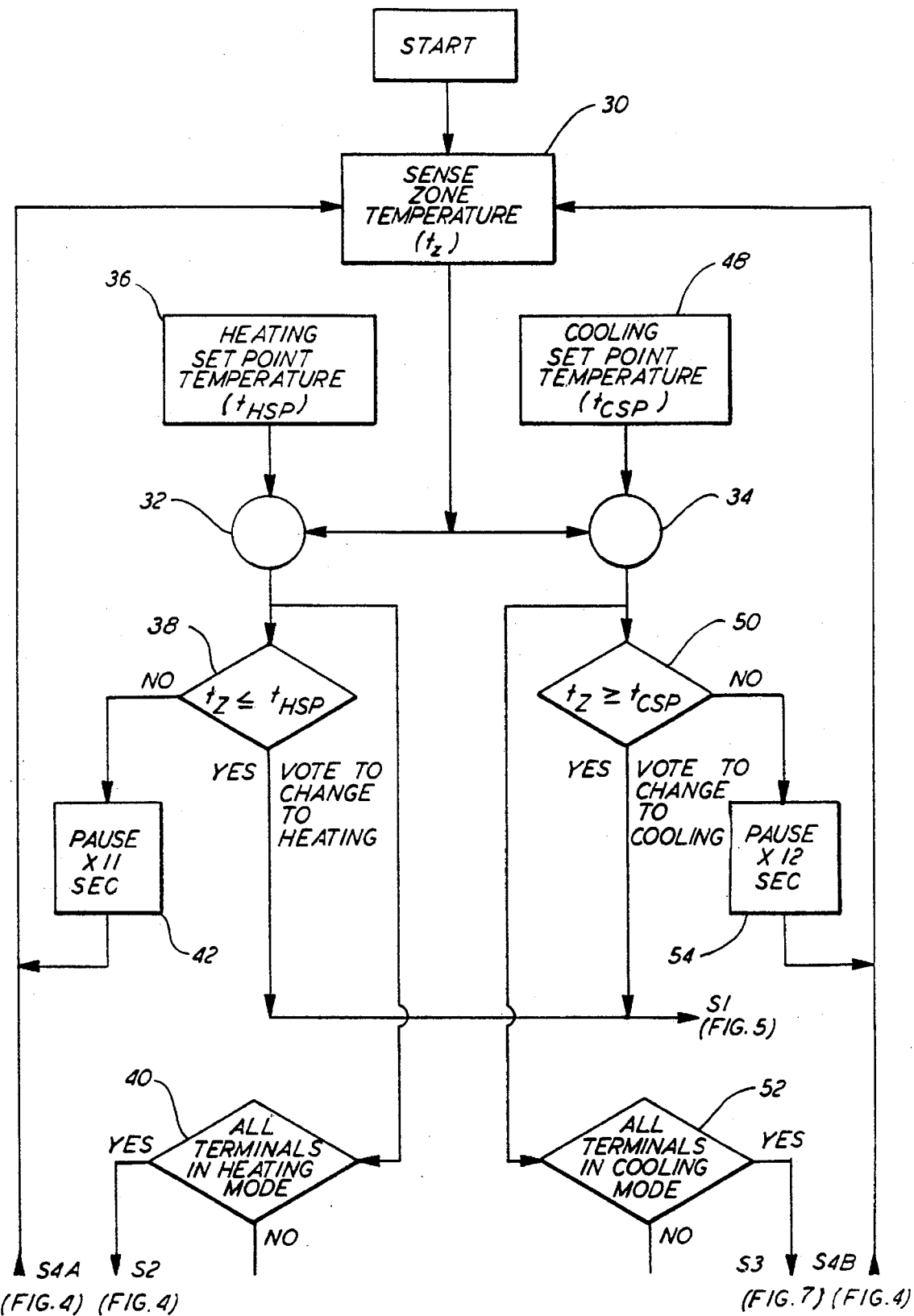
FIG. 3 is a flow diagram of the mode selector for heating-cooling.

Referring now to FIG. 3, the process starts with the mode selector for heating-cooling. The zone temperature $t_z$ is sensed in each zone as indicated by the block 30 and is supplied as a first input to comparators designated by blocks 32 and 34, respectively. Block 30 receives data signals S4A and S4B which are used to determine when to initiate a cycle. The heating set point temperature $t_{hsp}$ is sensed, as indicated by block 36, and is supplied as a second input to block 32. The output of block 32 which is a comparison to $t_z$ and $t_{hsp}$ is supplied as the input to blocks 38 and 40. In block 38, if $t_z$ is not less than or equal to $t_{hsp}$, no heating If $t_z$ is less than or equal to $t_{hsp}$, then a vote, S1, is is required and a return signal is supplied to block 30 after an appropriate pause of x11 seconds as indicated by block 42. supplied to block 44 of FIG. 5 indicating a change to heating. In block 40 it is determined whether or not all of the terminals are in the heating mode, or calling for heating, as indicated by $t_z$ being less than or equal to $t_{hsp}$ in every case. If only some of the terminals are in the heating mode, it is necessary for the voting to place the terminals of the system in one mode or the other since air handler 10 is an all air changeover unit which has no heating or cooling downstream of it. If all of the terminals are in the heating mode, this information, S2, is supplied from block 40 to block 46 of FIG. 4. If all of the terminals are not in the heating mode as determined in block 40 there is no further action in view of the votes supplied to block 44.

Figure 10:
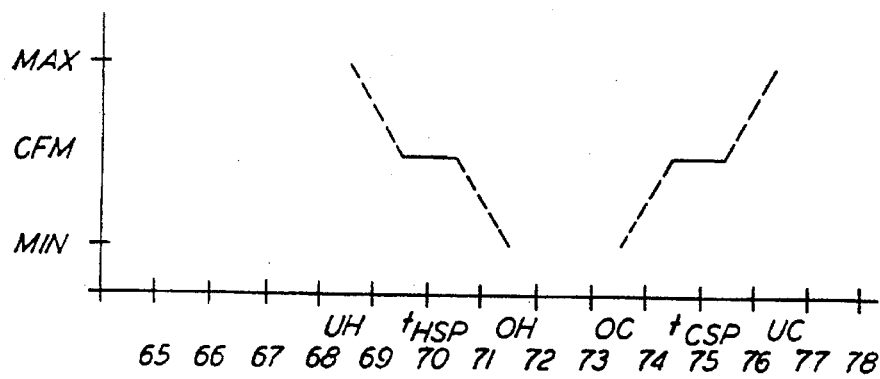
FIG. 10 is a graph of air flow in cfm vs. temperature in Fahrenheit for an individual terminal.

The cooling set point temperature $t_{csp}$ is sensed, as indicated by block 48 and is supplied as a second input to block 34. The output of block 34 which is a comparison of $t_z$ and $t_{csp}$ is supplied as the input to blocks 50 and 52. In block 50 if $t_z$ is not greater than or equal to $t_{csp}$, no cooling is required and a return signal is supplied to block 30 after an appropriate pause of x12 seconds as indicated by block 54. If $t_z$ is greater than or equal to $t_{csp}$, then a vote, S1, is supplied to block 44 of FIG. 5 indicating a change to cooling. It will be noted that there is a dead band between $t_{csp}$ and $t_{hsp}$ extending for several degrees, as is best illustrated in FIG. 10, so as to avoid cyclic changeover between heating and cooling. In block 52 it is determined whether or not all of the terminals are in the cooling mode as indicated by $t_z$ being greater than or equal to $t_{csp}$ in every case if, as in the case of block 40, only some of the terminals are in the cooling mode or calling for cooling, it is necessary for the voting to place the terminals of the system in one mode or the other. If all of the terminals are in the cooling mode, this information, S3, is supplied from block 52 to block 56 of FIG. 7.

Figure 4:
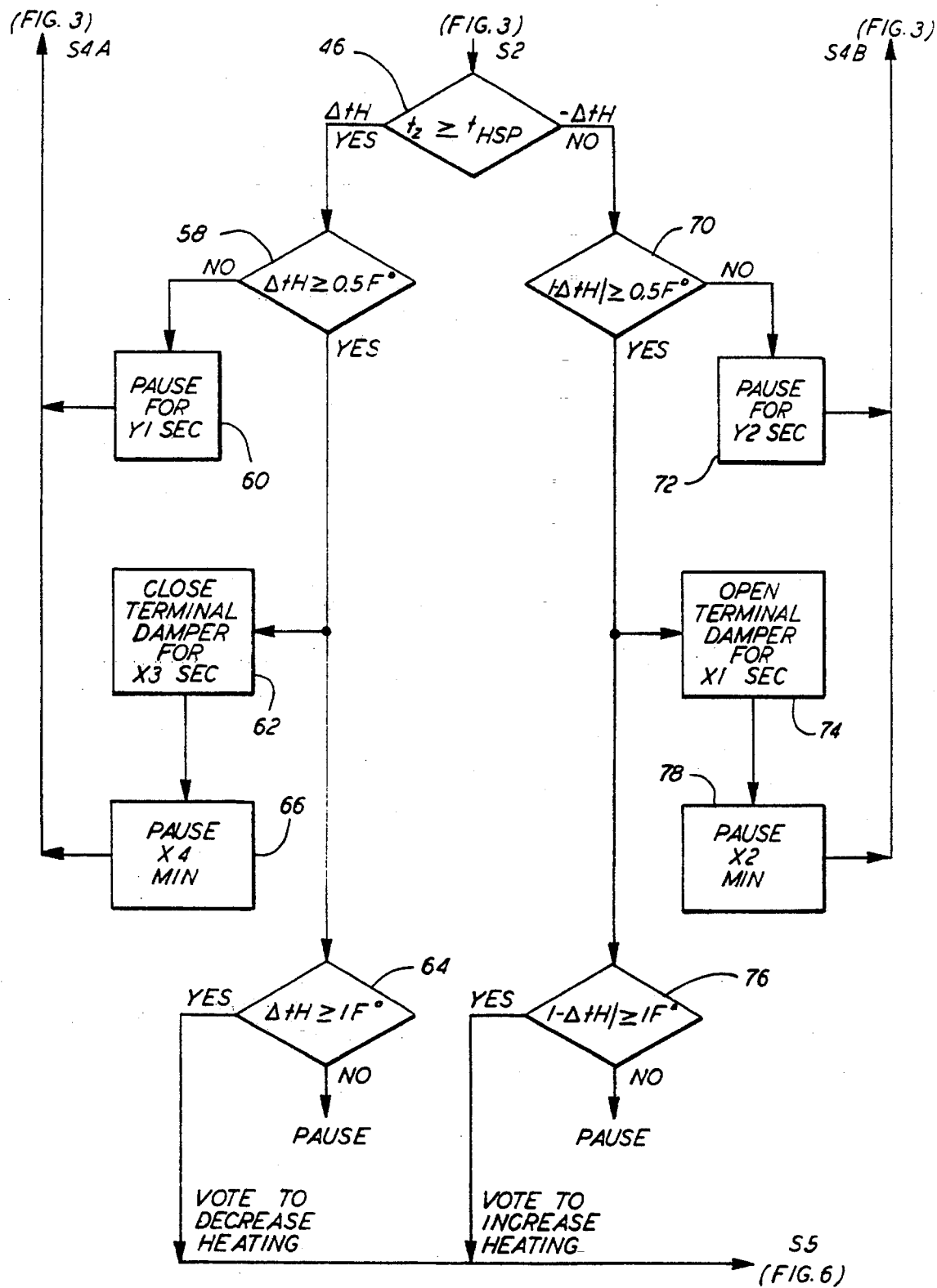
FIG. 4 is a flow diagram of the air terminal control for heating.

Referring now to FIG. 4 which shows the air terminal control for heating, the output of block 40 which is supplied, S2, to block 46 is the comparison of $t_z$ and $t_{hsp}$. As best shown in FIG. 10, there is a stable or deadband cfm range centered at $t_{hsp}$ and illustrated as extending over a one degree range or from $t_{hsp}-0.5F°$ to $t_{hsp}+0.5F°$ in which no change is made. In block 46 it is determined whether $t_z$ is greater than or equal to $t_{hsp}$ (the zone temperature is greater than or equal to the heating set point and therefore requires more heating), or not, and how much the difference in heating temperature, $\Delta t_h$, is and its sign. If $t_z$ is greater than or equal to $t_{hsp}$, the difference, $\Delta t_h$, is supplied to block 58 where it is determined whether or not $\Delta t_h$ is greater than or equal to 0.5F° which determines whether or not it is in the dead band. If $\Delta t_h$ is not greater than or equal to 0.5F°, the zone is in the dead band and no adjustment is needed so there is a pause for y1 seconds, indicated by block 60, whereupon a signal, S4A, will be supplied to block 30 of FIG. 3. If $\Delta t_h$ is greater than or equal to 0.5F°, the zone is too warm, and this information is supplied to blocks 62 and 64. As indicated in block 62, the damper is moved toward closing for an appropriate time period of x3 seconds, then there is a pause for an appropriate time period of x4 minutes, designated by block 66, before this information is supplied, S4A, to block 30 of FIG. 3. In block 64 it is determined whether or not $\Delta t_h$ is greater than or equal to 1F° or whether the zone is more than 1F° too warm. If $\Delta t_h$ is not greater than or equal to 1F°, there is a pause and no action is necessary in view of the action taken in blocks 62 and 66. If, however, $\Delta t_h$ is greater than 1F° then a vote, S5, to decrease the heating is supplied to block 68 of FIG. 6.

If $t_z$ is not greater than or equal to $t_{hsp}$, the difference, $-\Delta t_h$, is supplied from block 46 to block 70 where it is determined whether or not $|-\Delta t_h|$ is greater than or equal to 0.5F° which determines whether or not it is in the dead band. If $|-\Delta t_h|$ is not greater than or equal to 0.5F°, the zone is in the dead band and no adjustment is needed so there is a pause for y2 seconds, indicated by block 72, whereupon a signal, S4B, will be supplied to block 30 of FIG. 3. If $|-\Delta t_h|$ is greater than or equal to 0.5F°, the zone is too cool, and this information is supplied to blocks 74 and 76. As indicated in block 74, the damper is moved towards opening for an appropriate time period of x1 seconds, then there is a pause for an appropriate time period of x2 minutes, designated by block 78, before this information is supplied, S4B, to block 30 of FIG. 3. In block 76 it is determined whether or not $|-\Delta t_h|$ is greater than or equal to 1F° or whether the zone is more than 1F° too cool. If $|-\Delta t_h|$ is not greater than or equal to 1F°, there is a pause and no action is necessary in view of the action taken in blocks 74 and 78. If, however, $|-\Delta t_h|$ is greater than 1F° then a vote, S5 to increase the heating is supplied to block 68 of FIG. 6.

Figure 5:
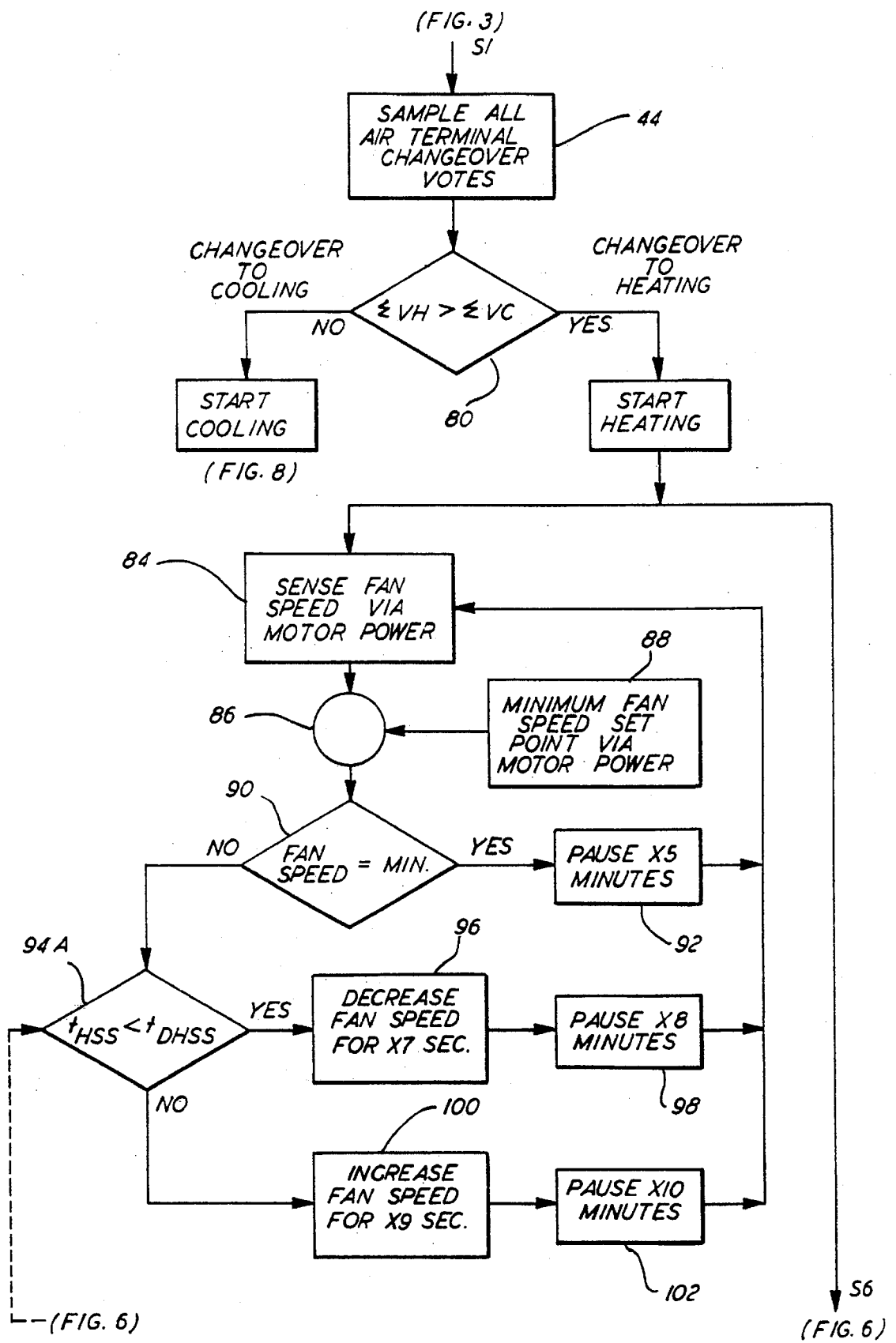
FIG. 5 is a flow diagram of the fan speed control for heating.
Figure 8:
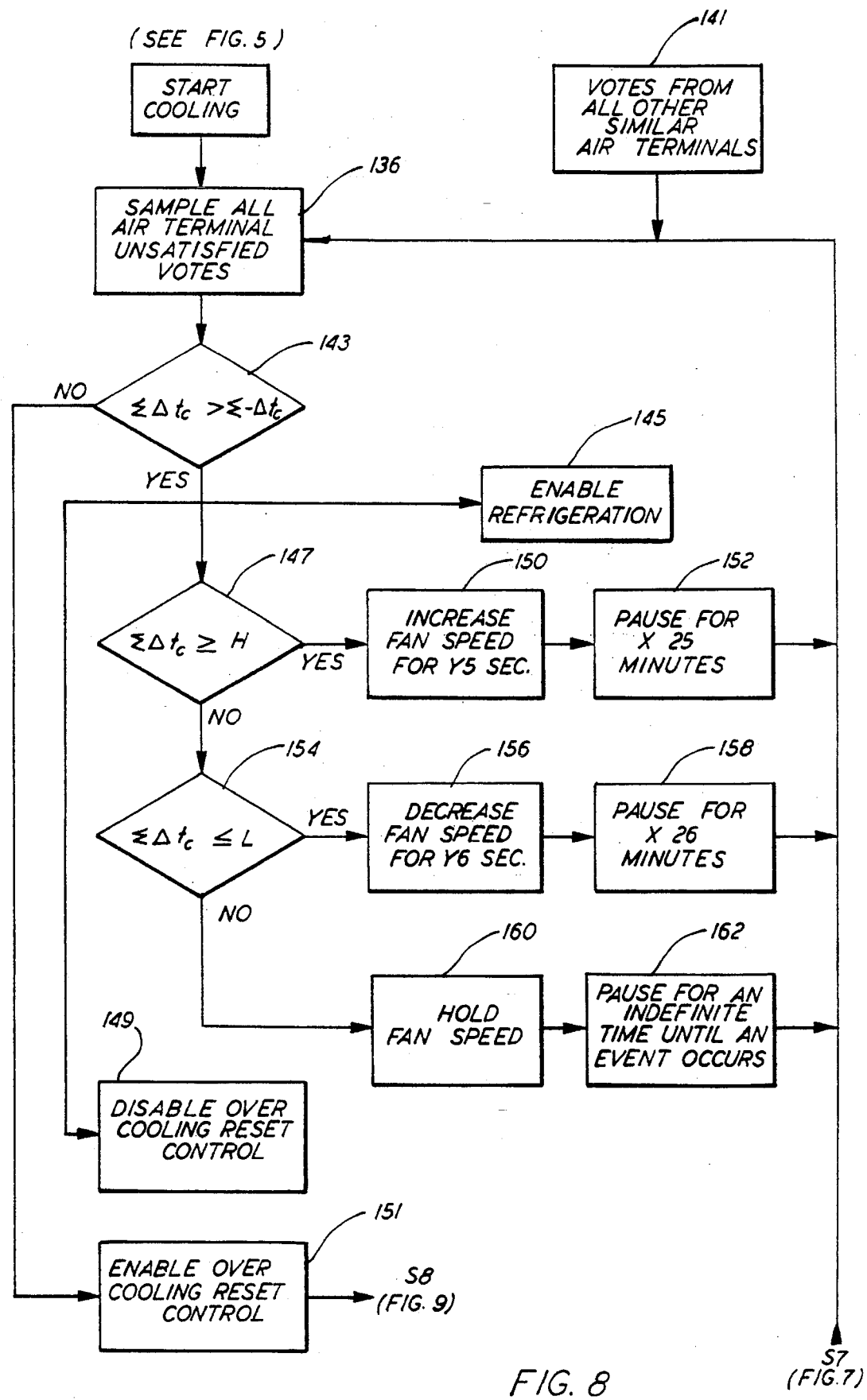
FIG. 8 is a flow diagram of the fan control in cooling.

The votes, S1, supplied by blocks 38 and 50 of FIG. 3 are supplied to block 44 of FIG. 5 which samples the changeover votes from all of the terminals for fan speed control for heating (FIG. 5) and cooling (FIG. 8). The votes VH for heating and VC for cooling which respectively represent $t_z$ less than $t_{hsp}$ and $t_z$ greater than $t_{csp}$ are summed and compared in block 80 of FIG. 5. If the sum of the votes for heating, $\Sigma$VH, is not greater than the sum of the votes for cooling, $\Sigma$VC, then there is a changeover to cooling and cooling is started as shown in FIG. 8, assuming that the system was in the heating mode, otherwise cooling is continued. Cooling takes preference over heating as cooling zones that are sufficiently over temperature get two votes. If, however, the sum of the votes for heating is greater than the sum of the votes for cooling, then there is a changeover to heating, assuming that the system was in the cooling mode, otherwise heating is continued. Whether there is a changeover to heating or if heating is continued, an actuation input is supplied to block 84 of FIG. 5 and an actuation signal, S6, is supplied to block 68 of FIG. 6. Block 84 senses the fan speed of air handler 10 via the motor power and supplies this as a first input to comparator 86. The minimum fan speed set point via motor power is determined at block 88 and supplied as a second input to comparator 86. The output of comparator 86 indicates whether or not the fan speed is at a minimum as indicated at block 90. If the fan speed is at a minimum, there is a pause for an appropriate Time period of x5 minutes, as indicated by block 92, before returning to the step of block 84 to sense the fan speed via motor power. If the fan speed is not a minimum as determined in block 90 then block 94A, which is the same as block 94B of FIG. 6, determines whether or not the temperature of the heating supply set point, $t_{hss}$, is less than the temperature of the design heating supply set point, $t_{dhss}$. If $t_{hss}$ is less than $t_{dhss}$, then the fan speed is decreased for an appropriate period of x7 seconds, as indicated by block 96, followed by a pause for an appropriate period of x8 minutes, as indicated by block 98, before returning to the step of block 84. If $t_{hss}$ is not less than $t_{dhss}$, then the fan speed is increased for an appropriate period of x9 seconds, as indicated by block 100, followed by a pause for an appropriate period of x10 minutes, as indicated by block 102, before returning to the step of block 84.

Figure 6:
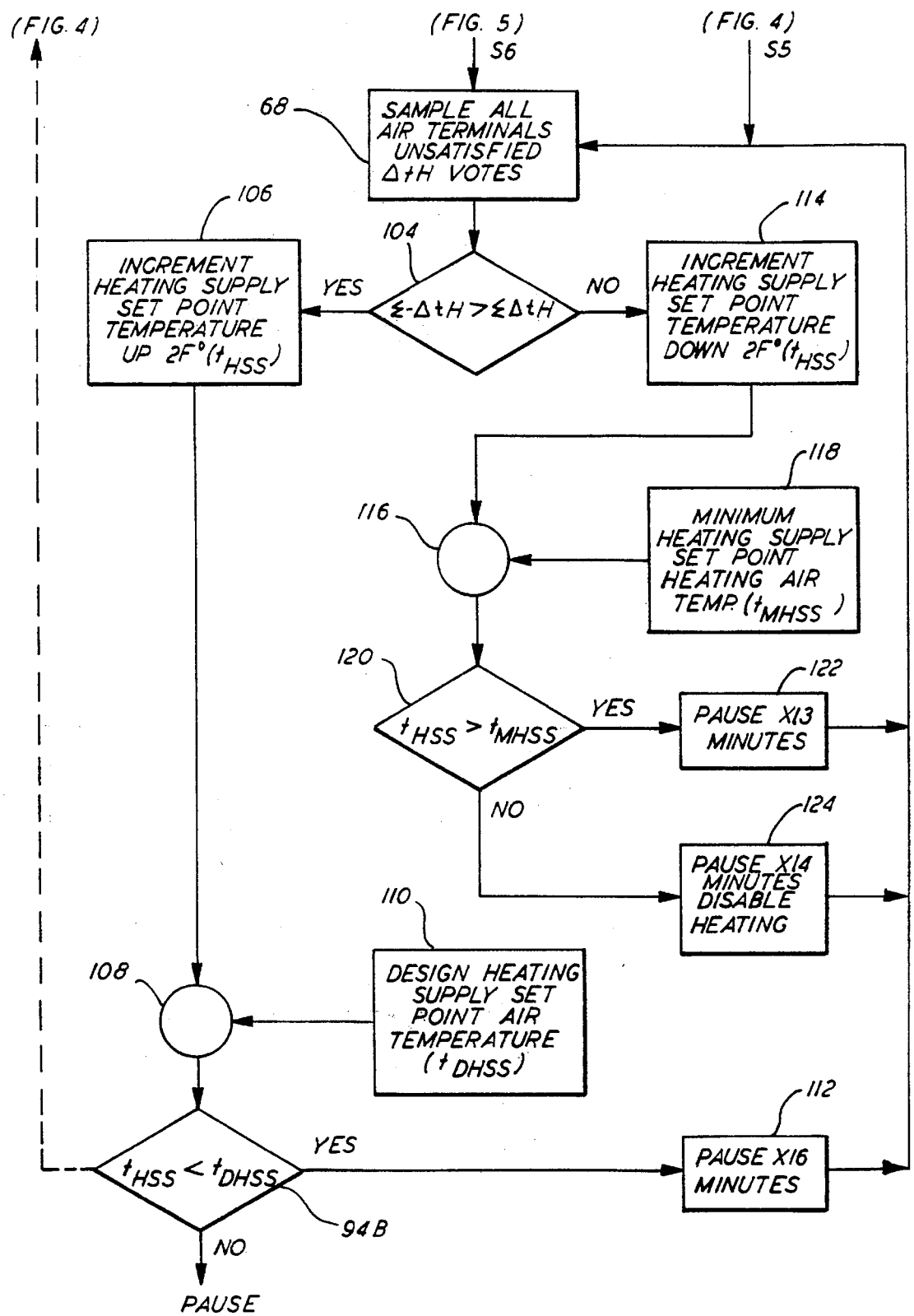
FIG. 6 is a flow diagram of the supply air reset for heating.

Block 68 of FIG. 6 is actuated, S6, responsive to the start heating step of FIG. 5 and responsive thereto samples all air terminals which have unsatisfied differential temperatures in heating, $-\Delta t_h$ and $\Delta t_h$, votes, S5, supplied from blocks 64 and 76 of FIG. 4, respectively. Block 104 sums up the $-\Delta t_h$ and $\Delta t_h$ votes and if the $-\Delta t_h$ votes are greater than the $\Delta t_h$ votes, representing a need for increased heating, then the heating supply set point temperature, $t_{hss}$, is incremented up 2F°, as indicated by block 106, and is supplied as a first input to comparator 108. The design heating supply set point air temperature, $t_{dhss}$, is supplied by block 110 as a second input to comparator 108 and the resultant is supplied to block 94B which is the same as block 94A of FIG. 5. If $t_{hss}$ is not less than $t_{dhss}$ then there is a pause until initiation of action by some other part of the system, since $t_{hss}$ cannot be raised without taking it further out of design. If, $t_{hss}$ is less than $t_{dhss}$ then there is an appropriate pause of x16 minutes, as indicated by block 112 before initiation of the step of block 68. If the $-\Delta t_h$ votes are not greater than the $\Delta t_h$ votes representing a decreased need for heating then $t_{hss}$ is incremented doom 2F° as indicated by block 114 and is supplied as a first input to comparator 116. The minimum heating supply set point air temperature, $t_{mhss}$, is supplied by block 118 as a second input to comparator 116 and the resultant is supplied to block 120. If $t_{hss}$ is greater than $t_{mhss}$ then there is an appropriate pause of x13 minutes, as indicated by block 122, before initiation of the step of block 68. If $t_{hss}$ is not greater than $t_{mhss}$ then the heating is disabled and there is an appropriate pause of x16 minutes, as indicated by block 124, before initiation of the step of block 68.

Figure 7:
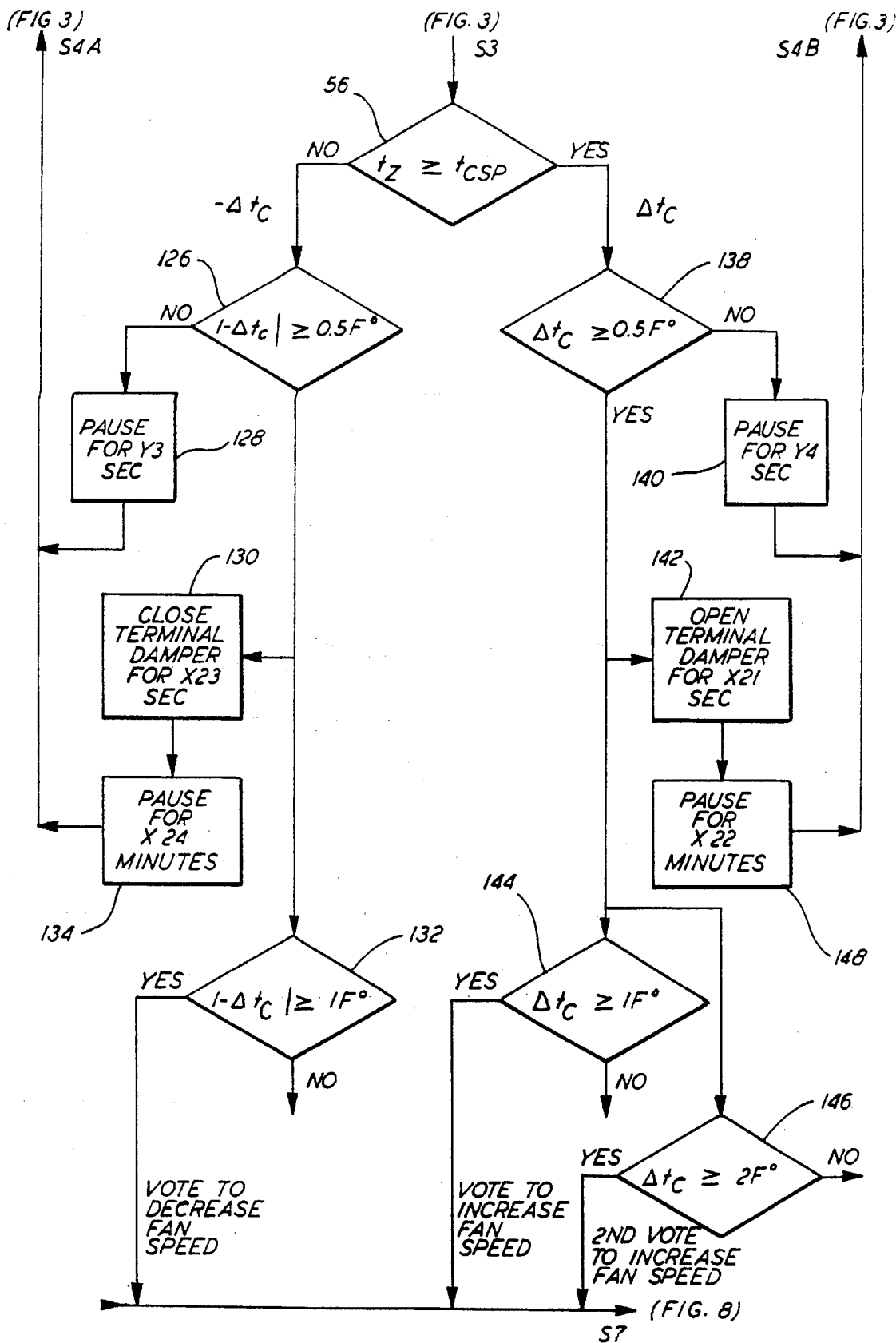
FIG. 7 is a flow diagram of the air terminal control in cooling.

If all of the terminals are in the cooling mode as determined at block 52 of FIG. 3, then a signal, S3 is supplied to block 56 of FIG. 7. In block 56 it is determined whether $t_z$ is greater than or equal to $t_{csp}$ and how much the at difference in cooling temperature, $\Delta t_c$, is and its sign. If $t_z$ is not greater than or equal to $t_{csp}$ the zone temperature is less than or equal to the cooling set point and therefore requires less or no additional cooling. If $t_z$ is not greater than or equal to $t_{csp}$, the difference, $-\Delta t_c$, is supplied to block 126 where it is determined whether or not $|-\Delta t_c|$ is greater than or equal to 0.5F° which determines whether or not it is in the dead band. If $|-\Delta t_c|$ is not greater than or equal to 0.5F°, the zone is in the dead band and no adjustment is needed so there is a pause for y3 seconds, indicated by block 128, whereupon a signal, S4A, will be supplied to block 30 of FIG. 2. If $|-\Delta t_c|$ is greater than or equal to 0.5F°, the zone is too cool and this information is supplied to blocks 130 and 132. As indicated in block 130, the damper is moved towards closing for an appropriate time period of x23 seconds, then there is a pause for an appropriate time period of x24 minutes, designated by block 134, before this information is supplied, S4A, to block 30 of FIG. 3. In block 132 it is determined whether or not $|-\Delta t_c|$ is greater than or equal to 1F° or whether the zone is at least 1F° toe cool. If $|-\Delta t_c|$ is not greater than or equal to 1F°, no action is necessary in view of the action taken in blocks 130 and 134. If, however, $|-\Delta t_c|$ is greater than or equal to 1F° then a vote, S7, to decrease the fan If $t_z$ is greater than or equal to $t_{csp}$, the difference, speed is supplied to block 136 of FIG. 8. $\Delta t_c$, is supplied from block 56 to block 138 where it is determined whether or not $\Delta t_c$ is greater than or equal to 0.5F° which determines whether or not it is in the dead band. If $\Delta t_c$ is not greater than or equal to 0.5F°, the zone is in the dead band and no adjustment is needed so there is a pause for y4 seconds, indicated by block 140, whereupon a signal, S4B will be supplied to block 30 of FIG. 3. If $\Delta t_c$ is greater than or equal to 0.5F°, the zone is too warm, and this information is supplied to blocks 142, 144 and 146. As indicated in block 142, the damper is moved towards opening for an appropriate time period of x21 seconds, then there is a pause for an appreprate tine period of x22 minutes, designated by block 148, before this information is supplied, S4B, to block 30 of FIG. 3. In block 144 it is determined whether or not $\Delta t_c$ is greater than or equal to 1F° or whether the zone is more than 1F° too warm. If $\Delta t_c$ is not greater than 1F°, no action is necessary in view of the action taken in blocks 142 and 148. If, however, $\Delta t_c$ is greater than or equal to 1F°, a vote, S7, to increase the fan speed, and thereby the cooling, is supplied to block 136 of FIG. 8. In block 146 it is determined whether or not $\Delta t_c$ is greater than or equal to 2F°. If $\Delta t_c$ is not greater than or equal to 2F°, no action is necessary in view of the action taken in blocks 142, 144 and 148. If, however, $\Delta t_c$ is greater than or equal to 2F°, a second vote, S7, to increase the fan speed is supplied to block 136 of FIG. 8. This second vote gives a weighted voting or temperature override to take into account how far away from the set point a zone is as well as taking into account how far out of range a zone is when the system is being operated such that a certain small percentage, eg. 2%, 4%, or 6%, of the terminals can be dissatisfied without triggering a response.

If the summation in block 80 of FIG. 5 was such that the sum of the votes for heating was not greater than the sum of the votes for cooling, i.e. there were more votes for cooling, cooling is started as shown in FIG. 8, assuming that the system was in the heating mode, otherwise cooling is continued. Starting at block 136 of FIG. 8, all of the unsatisfied air terminal votes are sampled including those votes from all other similar terminals, as indicated at block 141. Block 143 sums all of the $\Delta t_c$, and $-\Delta t_c$ votes representing too warm/undercooling and too cool/overcooling, respectively. If the sum of the votes, $\Sigma \Delta t_c$, representing undercooling is not greater than the sum of the votes, $\Sigma -\Delta t_c$, representing overcooling then the overcooling reset control is enabled as indicated by block 151 and a signal, S8, is supplied to block 153 of FIG. 9. If the sum of the $\Delta t_c$ votes is greater than the sum of the $-\Delta t_c$ votes, i.e. there are more undercooled than overcooled zones, the refrigeration is enabled, as indicated by block 145, the overcooling reset control is disabled as indicated by block 149 and block 147 determines whether the sum of $\Delta t_c$ votes is greater than or equal to H, the maximum allowable number of unsatisfied terminals, or unsatisfied votes where plural votes are possible. If the sum of the $\Delta t_c$ votes is greater than or equal to H, the fan speed is increased for y5 seconds, as indicated by block 150, and after an appropriate pause for x25 minutes, as indicated by block 152, before signaling block 136. If the sum of the $\Delta t_c$ votes is not greater than or equal to H, then block 154 determines whether or not the sum of the $\Delta t_c$ votes is less than or equal to L, the desired minimum number of unsatisfied votes. If the sum of the $\Delta t_c$ votes is less than or equal to L, then the fan speed is decreased, as indicated by block 156 for y6 seconds, followed by a pause of x26 seconds, as indicated by block 158, before signaling block 136. If the sum of the $\Delta t_c$ votes is not less than or equal to L, or in other words it is in the range between L and H, the fan speed is held, as indicated by block 160, and there is a pause for an indefinite time until an event occurs, as indicated by block 162. An "event" would be a change in the system triggering a response.

Figure 9:
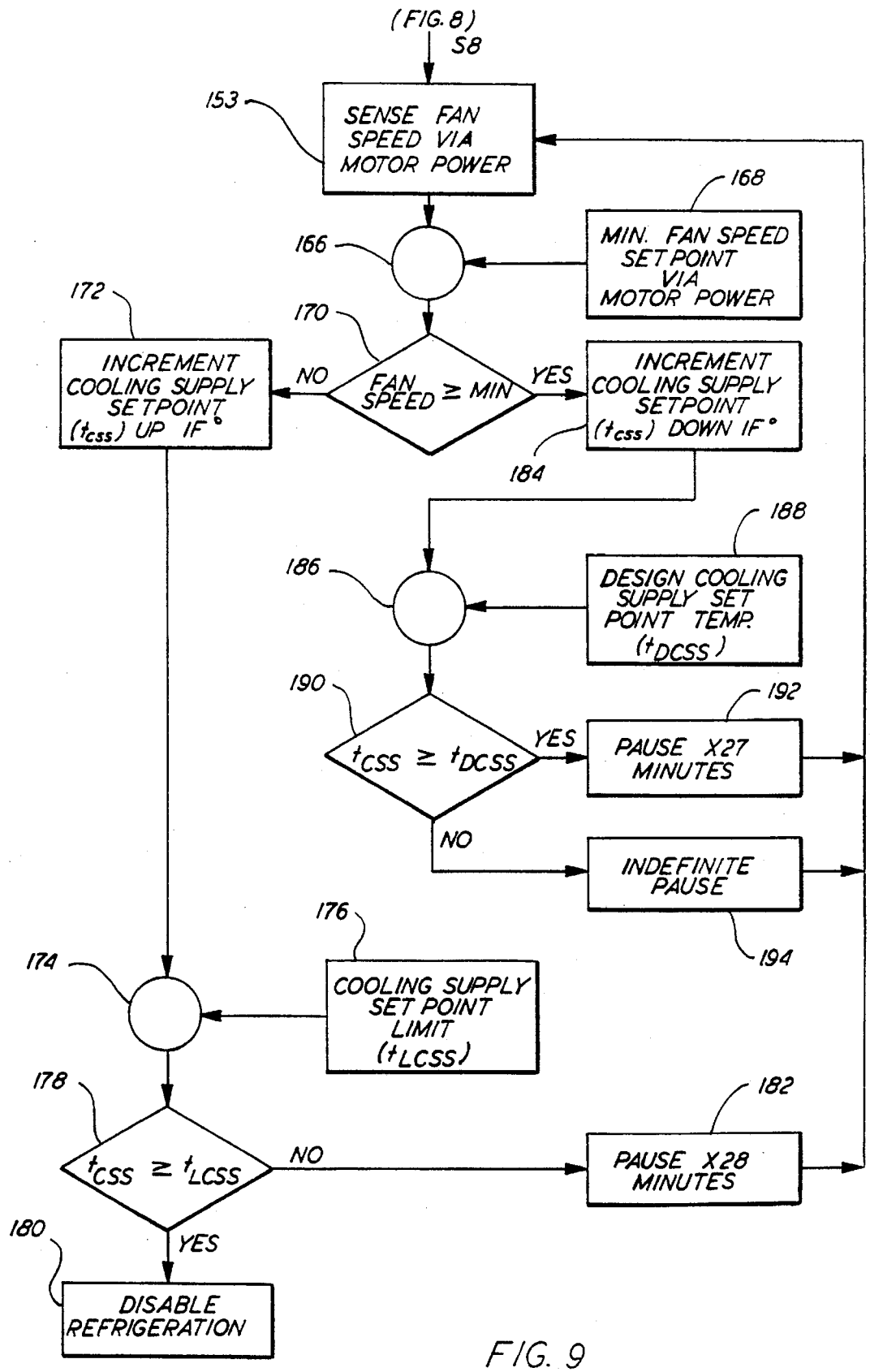
FIG. 9 is a flow diagram of the overcooling reset control.

As noted, if the sum of the votes, $\Delta t_c$, representing undercooling is not greater than the sum of the votes, $-\Delta t_c$, representing overcooling then a signal, S8 is supplied from block 143 of FIG. 8 via block 151 to block 153 of FIG. 9. In block 153 the fan speed is sensed via motor power and is supplied as a first input to comparator 166. The minimum fan speed set point via motor power is supplied from block 168 to comparator 166 as a second input. As indicated at block 170, it is determined whether or not the fan speed is greater than or equal to the minimum speed. If the fan speed is not greater than or equal to the minimum speed, the cooling supply set point, $t_{css}$, is incremented up 1F°, as indicated by block 172, and the new value of $t_{css}$ is supplied as a first input to comparator 174. The cooling supply set point limit, $t_{lcss}$, is supplied from block 176 to comparator 174 as a second input. As indicated at block 178, the new value of $t_{css}$ is compared to $t_{lcss}$. If $t_{css}$ is greater than or equal to $t_{lcss}$, the refrigeration is disabled as indicated by block 180. If $t_{css}$ is not greater than or equal to $t_{lcss}$ then there is a pause for an appropriate time period of x28 minutes, as indicated by block 182, before signaling block 153.

If the fan speed is greater than or equal to the minimum fan speed, as indicated in block 170 the cooling supply set point, $t_{css}$, is incremented down 1F°, as indicated by block 184 and this new value of $t_{css}$ is supplied as a first input to comparator 186. The design cooling supply set point temperature, $t_{dcss}$, as indicated by block 188 is supplied as a second input to comparator 186. As indicated by block 190, the new value of $t_{dcss}$ is compared to $t_{dcss}$ and if $t_{css}$ is greater than or equal to $t_{dcss}$ there is a pause for an appropriate time period of x27 minutes, as indicated by block 192, before signaling block 144. If $t_{css}$ is not greater than or equal to $t_{dcss}$, there is an indefinite pause, indicated by in FIG. 10, the terminal $t_{hsp}$ is at 70° F. and $t_{csp}$ is at block 194, until an event occurs.

In FIG. 10, the terminal $t_{hsp}$ is at 70° F. and $t_{csp}$ is at 75° F. The horizontal portions of the graphs represent the dead bands which for heating is from 69.5° F. to 70.5° F. and for cooling is from 74.5° F. to 75.5° F. The dashed sloped portions of the graphs would actually be a number of steps depending upon the details of the specific values of the time periods employed in opening and closing the dampers etc. The dashed sloped lines end at the volume limits of the terminal and reading from left to right the ends represent underheating (UH), overheating (OH), overcooling (OC) and undercooling (UC). Between the overheating point, OH, and the overcooling point, OC, is a free energy zone in which there is neither heating nor cooling but ventilation at the minimum flow rate and which represents the dead band between heating and cooling. Except for the switch over between heating, and cooling, all of the other operations take place at the terminal.

Figure 11A:
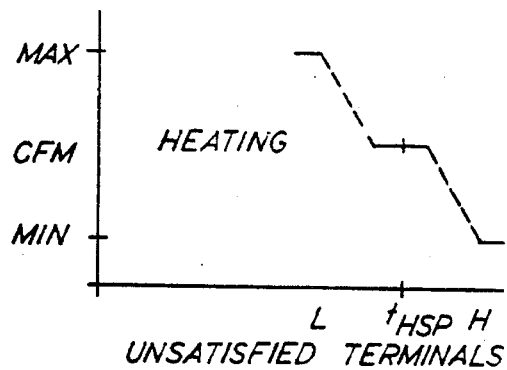
FIG. 11 A and B are graphs of the output of the fan of the air handler unit in cfm vs. terminals unsatisfied for heating and cooling respectively.
Figure 11B:
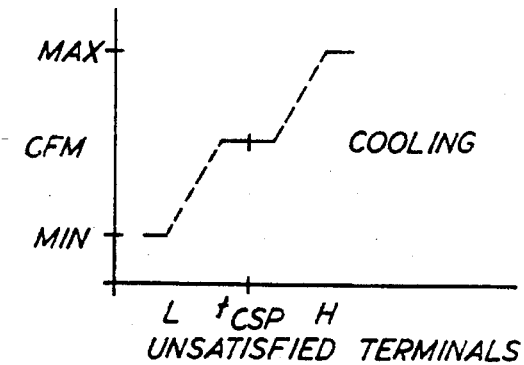

In FIGS. 11A and B the relationship of air handler output in cfm to terminal satisfaction is shown. Referring specifically to FIG. 11B, the points L and H are those discussed with respect to blocks 147 and 154 of FIG. 8. The horizontal portion of these graphs represent the dead band and the stable operation indicated by blocks 160 and 162. L and H are labeled on both FIGS. 11A and B but they can be the same or different values in both modes.

Figure 12:
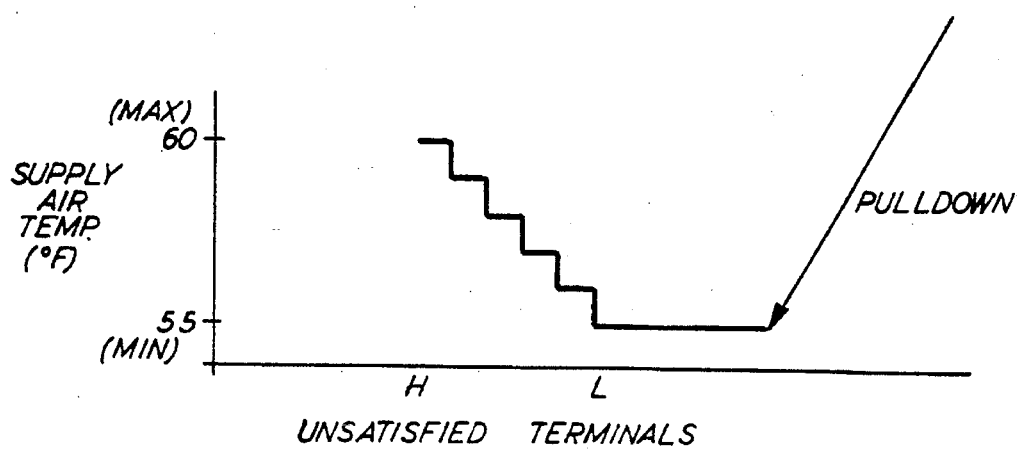
FIG. 12 is a graph of the supply air temperature vs. terminals unsatisfied for cooling.

FIG. 12 shows the relationship of the points L and H discussed with respect to blocks 147 and 154 of FIG. 8 together with the 1F° incrementing of cooling supply setpoint, $t_{css}$, which was discussed with respect to blocks 172 and 184 of FIG. 9. Basically, when overcooling is taking place at the minimum fan speed, the supply air temperature is raised so that more air is required to achieve cooling so that ventilation requirements can be met without, or at least with reduced, overcooling.

The various algorithms previously described can be summarized as follows:

Control Air Terminal Damper Strategy

The purpose of this algorithm is to control zone space temperature. The space temperature is controlled by means of a VAV terminal. The air terminal will be controlled by such a means that air flow change will take place fast enough to track the load, yet slow enough to prevent noticeable sound change. Terminals using a bellows that inflates or deflates to change air flow and is controlled by solenoid valves or electric motor actuators for opening and closing a damper are suitable. In addition to space temperature control, the air terminal provides operational balancing of the supply air duct system. Specifically, Δt is sensed and the air flow is reset higher when Δt goes above the cooling dead band. If a flow sensor is used for the cooling mode it is also necessary that the sensed flow is below the maximum flow setting. This will open the damper and control an increased air flow. If an air flow sensor is not used, the damper will be directly opened more if it is not open to the maximum position limit. If the sensed Δt is within the dead band, no additional action will be taken. However, if the sensed Δt goes below this dead band, the air flow will be reset lower if it is above the minimum setting where a flow sensor is used. The damper will be closed more if it is above the minimum position where no flow sensor is used.

Air Terminal/Air Handler Interface-Fan Volume Control Strategy

The purpose of this algorithm is to control fan volume on the air handler fan such that it supplies only the pressure needed by the air terminals at minimum fan energy. Specifically, all of the air terminal control Δt's are polled to determine if more or less air is needed. If a few are unsatisfied, the fan speed should be increased. If nearly all are satisfied, the fan speed will remain unchanged. If all are satisfied, the fan speed will be decreased. The fan speed change rate must be slower than the changes at the terminals by a factor of at least ten to prevent air flow perturbations. Additionally, it may be desirable to eliminate particular zones from voting.

Supply Air Temperature Reset—Overcooling Strategy

As air terminals shut down during the intermediate season, two undesirable phenomena can occur, namely, over cooling and inadequate air circulation. These conditions can be accommodated by the algorithm in which all of the zone air terminal Δt's are polled and, when several become negative (i.e. the temperature is below the cooling set point dead band), the air handler supply air temperature will be reset up. Air terminals which were satisfied, but throttling, will open and call for more air via the air terminal/air handler interface—fan volume control strategy. The resetting up of the supply temperature is in 1F° increments and will stop/reverse for any of the following reasons: (1) there are no longer sufficient negative zone Δt's; (2) there are too many unsatisfied cooling zones; (3) fan motor power is no longer in an economical operating range; and, (4) the user's selectable limit of reset has been reached. It should be noted that the resetting up of the supply air temperature or throttling on the chilled water valve can be sensed by the system control as a reason to reset the chilled water temperature.

Pulldown Balancing Of Primary Air Flow

Figure 13:
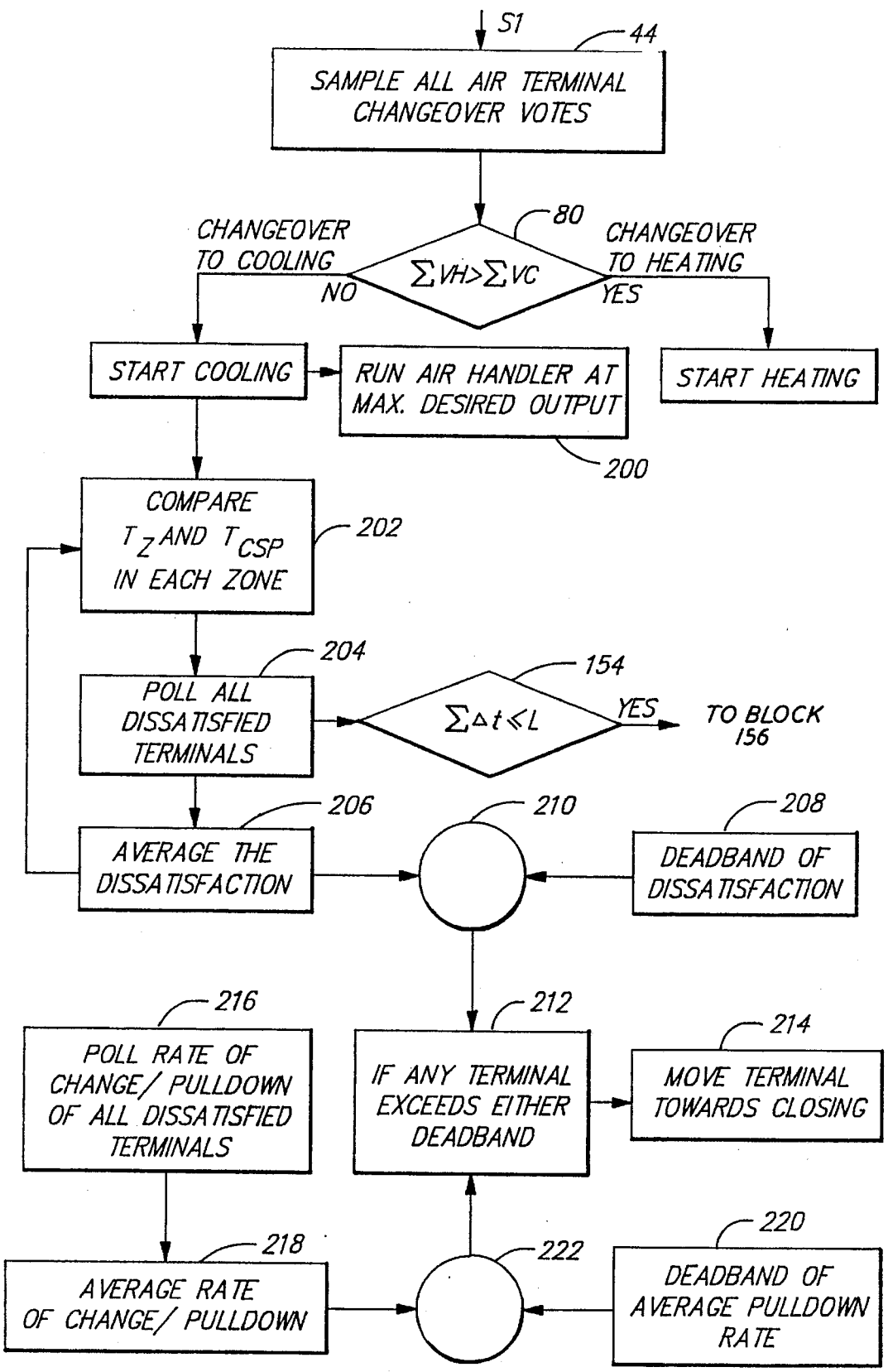
FIG. 13 is flow diagram for controlling the pull down balance.

The purpose of this algorithm is to balance the air terminals on pull down on startup or changeover such that the pull down rates are all equal or are biased in a previously determined manner to achieve faster pull downs in desired areas through a Δt preference. Pull down for cooling is graphically represented in FIG. 12. On start up, The air terminals nearest to the fan will have the highest pressure and the lowest supply air temperature for the coding node. These air terminals will tend to pull down at a faster rate than air terminals at the end of the duct run. Equal pull down rates are a real user benefit in getting a building under control. Referring now to FIG. 13, boxes 44 and 80 are the same as they are in FIG. 5. However, on startup or changeover to cooling, the cooling system is enabled rather than continued in operation. While pull down is occurring, the air handler fan is run at full speed or design speed as indicated by block 200. Specifically, all of the zone Δt's are compared as indicated by box 202 and polled as indicated by block 204 but since Δt's exist only for dissatisfied terminals the result is that, in effect, only the dissatisfied terminals are polled. As shown in FIG. 12, pull down and running the system at minimum temperature takes place until the number of unsatisfied terminals is L. So, when $\Sigma \Delta t \leq L$, as indicated by block 154 which also appears in FIG. 8, the system is under control and would then be operated as shown in FIG. 8. After the dissatisfied terminals are polled as indicated by block 202, the dissatisfaction is averaged and this average is compared with the dead band of dissatisfaction from block 208 in comparator 210. Also polled is the change rate of all of the Δt's (derivative) as indicated block 216 and this is also averaged as indicated by block 218. When the pull down rate of some terminals exceeds the dead band of the average pull down rate like those similarly determined by comparator 210 will be identified as indicated by block 212, they will receive a pulse, as indicated by blank 214, to move toward closing for an appropriate time period. The pulse to close will take the form of a bias to the Δt so that the control air terminal damper strategy algorithm will operate to decrease the air terminal air flow. Once the average Δt comes under control, as indicated above, this pull down balancing algorithm will become inactive and the other appropriate algorithms will continue to perform as described.

Change Over Cooling To Primary Air Heating—Warm Up

The purpose of the warm up and occupied heating algorithm is to change over the air terminal and air handler operating modes to heating. The air terminal change over is such that air flow is decreased on a temperature rise. Warm up is used when the outside temperature is above the building balance point and after a shutdown period. Zone temperatures are below the occupied heating set point. This will also work where there is no interior zone so that occupied heating from the air terminals can be accomplished with a single zone air handler. Specifically, when the control receives a start signal and starts the air handler fan, all of the zone air terminals Δt's will be polled to determine if pull down or warm up is needed. Pull down balancing was described previously. Warm up will be determined as necessary when sufficient air terminal Δt's are below the dead band of the occupied heating temperature set points whereupon the air handler control will signal warm up. This will enable the heating means on the air handler (hot water or electric resistance) and disable the cooling. The air terminal controls, when signaled to operate in the warm up mode, will first switch to the occupied heating temperature set point and, second, all of the Δt's will be inverted. Warm up will now look like pull down to the control. The negatives will become positives and the positives will become negatives. The appropriate algorithms will continue to operate normally resulting in VAV heating with warm up balancing and fan volume control. Warm up or heating will continue until a sufficient number of zones are above the heating dead band similarly to that described with respect to the supply air temperature reset-overcooling. Instead of resetting supply air temperature, change over back to cooling will occur. The algorithm for sequence cooling to heating will be inoperative when this algorithm is used. The damper sensor and limiter may be set for maximum and minimum positions. An optional flow sensor may also be used instead of the damper position limiter. During warm up, the air handler heating coil will control to maintain a user settable constant temperature.

A damper position limiter may be used, and when set to limit the damper from full opening or closing will take precedence over the foregoing algorithms. All of the algorithms will perform as discussed with some enhanced and/or diminished results as the damper travel is limited.

An optional flow sensor may also be employed and, when employed, will replace the damper position limiter. Maximum and/or minimum air flow can be set and demonstrated as desired and will take precedence over the algorithms. All of the algorithms will perform as discussed with generally enhanced performance. Air flow is, however, controlled at minimum and/or maximum settings by the flow sensor. In between, the Δt algorithms take over and while the system will no longer be technically pressure independent, it will satisfy its intent for space and temperature maintenance.

The thermal response of a room or a zone is the time necessary for a complete change of air and would be on the order of two to twenty change would occur if the air supply rates. A noticeable sound change would occur if the air changes at a rapid rate. Thus, while a zone temperature can be maintained by a fast responding system that is cycling between full open to full closed, the zone occupant(s) will be aware of the rapid sound change as a primary annoyance. With properly selected terminals and a stable control, full flow or minimum flow to balance the load will not produce a noticeable sound change. This time rate of change of air flow and sound are interrelated and a key function of control. When operating, a 10% change in fan speed should take at least twenty minutes and a 10% air flow change in a terminal should take on the order of two minutes to balance a prompt response and the avoidance of noticeable sound changes.

Although a preferred embodiment of the present invention has been specifically illustrated and described other changes will occur to those skilled in the art. It is therefore, intended that the scope of the present invention is to be limited only by the scope of the appended claims.

What is claimed is:

1. A method for controlling an air distribution system including a plurality of zones which are supplied with heated or cooled air by an air handler which supplies air to the zones through air terminals comprising the steps of:

determining the temperature in each zone;

comparing the temperature in each zone with a corresponding heating and cooling set point for the zone, and responsive thereto determining whether each zone requires heating or cooling;

determining whether the majority of the zones require heating or cooling and responsive thereto placing all of the terminals in a heating or cooling mode of operation;

supplying heated or cooled air in accordance with the mode of operation of the terminals;

comparing the temperature in each zone with the set point corresponding to the mode of operation to determine terminal satisfaction in each zone which is defined by the zone being at the set point corresponding to the mode of operation or within a predetermined dead band centered on the set point corresponding to the mode of operation;

operating each of the terminals so as to achieve terminal satisfaction; and controlling the air handler to supply air to enable the terminals to achieve terminal satisfaction.

2. The method of claim 1 wherein the step of controlling the air handler further includes the step of:

maintaining the number of terminals unable to achieve terminal satisfaction within a predetermined range.

3. The method of claim 1 further including the steps of:

determining whether each terminal is operating in the dead band range corresponding to the mode of operation; and overriding the operation of each terminal which is out of the dead band range corresponding to the mode of operation by appropriately repositioning the terminal damper if it is still within its range of movement.

4. The method of claim 1 further including the step of:

periodically sampling all of the terminals unable to achieve terminal satisfaction and causing the system to operate in the mode having the most terminals unable to achieve terminal satisfaction.

5. A method for controlling an air distribution system including a plurality of zones which are supplied with heated or cooled air by an air handler which supplies air to the zones through air terminals comprising the steps of:

determining the temperature in each zone;

comparing the temperature in each zone with a corresponding heating and cooling set point for the zone, and responsive thereto determining whether each zone requires heating or cooling;

determining whether the majority of the zones require heating or cooling and responsive thereto placing all of the terminals in a heating or cooling mode of operation;

supplying heated or cooled air in accordance with the mode of operation of the terminals;

comparing the temperature in each zone with the set point corresponding to the mode of operation to determine terminal satisfaction in each zone which is defined by the zone being at the set point corresponding to the mode of operation or within a predetermined dead band centered on the set point corresponding to the mode of operation;

operating each of the terminals so as to achieve terminal satisfaction;

controlling the air handler to supply air to enable the terminals to achieve terminal satisfaction so as to maintain the number of terminals unable to achieve terminal satisfaction within a predetermined range; and resetting the temperature of the supply air within a predetermined range when the step of determining terminal satisfaction in each zone determines that there is a predetermined degree of undercooling or overcooling for all of the zones.

6. A method for controlling an air distribution system including a plurality of zones which are supplied with heated or cooled air by an air handler which supplies air to the zones through air terminals comprising the steps of:

determining the temperature in each zone;

comparing the temperature in each zone with a corresponding heating and cooling set point for the zone, and responsive thereto determining whether each zone requires heating or cooling;

determining whether the majority of the zones require heating or cooling and responsive thereto placing all of the terminals in a heating or cooling mode of operation;

supplying heated or cooled air in accordance with the mode of operation of the terminals;

comparing the temperature in each zone with the set point corresponding to the mode of operation to determine terminal satisfaction in each zone which is defined by the zone being at the set point corresponding to the mode of operation or within a predetermined dead band centered on the set point corresponding to the mode of operation;

operating each of the terminals so as to achieve terminal satisfaction;

controlling the air handler to supply air to enable the terminals to achieve terminal satisfaction so as to maintain the number of terminals unable to achieve terminal satisfaction within a predetermined range; and resetting the temperature of the supply air within a predetermined range when the step of determining terminal satisfaction in each zone determines that there is a predetermined degree of overheating or underheating for all of the zones.

7. A method for controlling an air distribution system including a plurality of zones which are supplied with heated or cooled air by an air handler which supplies air to the zones through air terminals comprising the steps of:

determining the temperature in each zone;

comparing the temperature in each zone with a corresponding heating and cooling set point for the zone, and responsive thereto determining whether each zone requires heating or cooling;

determining whether the majority of the zones require heating or cooling and responsive thereto placing all of the terminals in a heating or cooling mode of operation;

supplying heated or cooled air in accordance with the mode of operation of the terminals;

comparing the temperature in each zone with the set point corresponding to the mode of operation to determine terminal satisfaction in each zone which is defined by the zone being at the set point corresponding to the mode of operation or within a predetermined dead band centered on the set point corresponding to the mode of operation;

operating each of the terminals so as to achieve terminal satisfaction;

controlling the air handler to supply air to enable the terminals to achieve terminal satisfaction so as to maintain the number of terminals unable to achieve terminal satisfaction within a predetermined range; and determining whether there is a predetermined degree of overcooling;

if there is a predetermined degree of overcooling, reducing the fan speed to the minimum acceptable amount;

if there is a predetermined degree of overcooling and fan speed is at the minimum acceptable amount, incrementally raising the supply air temperature within a predetermined range until the limits of the range are met or until the degree of overcooling has been reduced to a predetermined level.

8. A method for controlling an air distribution system including a plurality of zones which are supplied with heated or cooled air by an air handler which supplies air to the zones through air terminals comprising the steps of:

determining the temperature in each zone;

comparing the temperature in each zone with a corresponding heating and cooling set point for the zone, and responsive thereto determining whether each zone requires heating or cooling;

determining whether the majority of the zones require heating or cooling and responsive thereto placing all of the terminals in a heating or cooling mode of operation;

supplying heated or cooled air in accordance with the mode of operation of the terminals;

comparing the temperature in each zone with the set point corresponding to the mode of operation to determine terminal satisfaction in each zone which is defined by the zone being at the set point corresponding to the mode of operation or within a predetermined dead band centered on the set point corresponding to the mode of operation;

operating each of the terminals so as to achieve terminal satisfaction;

controlling the air handler to supply air to enable the terminals to achieve terminal satisfaction;

resetting the temperature of the supply air within a predetermined range when the step of determining terminal satisfaction in each zone determines that there is a predetermined degree of undercooling or overcooling for all of the zones.

9. A method for controlling an air distribution system including a plurality of zones which are supplied with heated or cooled air by an air handler which supplies air to the zones through air terminals comprising the steps of:

determining the temperature in each zone;

comparing the temperature in each zone with a corresponding heating and cooling set point for the zone, and responsive thereto determining whether each zone requires heating or cooling;

determining whether the majority of the zones require heating or cooling and responsive thereto placing all of the terminals in a heating or cooling mode of operation;

supplying heated or cooled air in accordance with the mode of operation of the terminals;

comparing the temperature in each zone with the set point corresponding to the mode of operation to determine terminal satisfaction in each zone which is defined by the zone being at the set point corresponding to the mode of operation or within a predetermined dead band centered on the set point corresponding to the mode of operation;

operating each of the terminals so as to achieve terminal satisfaction;

controlling the air handler to supply air to enable the terminals to achieve terminal satisfaction;

periodically sampling all of the terminals unable to achieve terminal satisfaction such that the degree to which the terminals are unable to achieve terminal satisfaction is taken into account in determining which mode has the most terminals unable to achieve terminal satisfaction; and causing the system to operate in the mode having the most terminals unable to achieve terminal satisfaction.

10. A method for controlling the pull down balance of an air distribution system on start up where the air distribution system includes a plurality of zones which are supplied with heated or cooled air by an air handler which supplies air to the zones through air terminals comprising the steps of:

determining the temperature in each zone;

comparing the temperature in each zone with the corresponding heating and cooling set points, and responsive thereto determining whether each zone requires heating or cooling;

determining whether the majority of the zones require heating or cooling and responsive thereto placing all of the terminals in the same mode of operation;

if cooling is required, start cooling;

comparing the temperature in each zone with the set point corresponding to the mode of operation to determine terminal satisfaction in each zone which is defined by the zone being at the set point corresponding to the mode of operation or within a predetermined dead band centered on the set point corresponding to the mode of operation;

running the air handler to supply air at the maximum desired output;

polling all terminals out Of the dead band range centered on the set point of the mode of operation thereby indicating dissatisfied terminals for the mode of operation;

averaging the dissatisfaction of the terminals;

polling the rate of change of temperature in the zones of all dissatisfied terminals which defines the pull down rate;

averaging the pull down rates for all the dissatisfied terminals;

comparing the average dissatisfaction of the terminals with a dead band of dissatisfaction;

if any terminals exceed a dead band of the average pull down rate, causing them to move toward closing; and continuing the operation until a predetermined number of terminals in the system are satisfied.

11. A method for controlling an air distribution system including a plurality of zones which are supplied with heated or cooled air by an air handler which supplies air to the zones through air terminals comprising the steps of:

determining the temperature in each zone;

comparing the temperature in each zone with a corresponding heating and cooling set point for the zone, and responsive thereto determining whether each zone requires heating or cooling and placing all of the terminals in the same mode of operation;

determining how many zones are out of a dead band range centered on the set point of the mode of operation thereby indicating terminal dissatisfaction for the mode of operation; and controlling the air handler responsive to the differences between the sensed temperature in each zone and the set point for the mode of operation for the corresponding zone so as to maintain the number of dissatisfied terminals within a predetermined range.

12. The method of claim 11 further including the step of:

limiting the rate of change in the amount of air supplied by the terminals to the zones and by the air handler to the terminals so as to prevent noticeable sound changes.

13. An air distribution system for controlling the supply of conditioned air to a plurality of zones comprising:

air distribution means;

air handler means for supplying conditioned air to said air distribution means;

a plurality of air terminal means operatively connected to said air distribution means for controlling the flow of conditioned air into a plurality of zones;

said air terminal means in each zone including:
means for sensing the temperature in each zone;
means for setting the set points for each zone; and
means for controlling each of said terminals responsive to the difference between the sensed temperature in each zone and the set
point for the corresponding zone;

means for controlling said air handler means responsive to said differences between the sensed temperature in each zone and the set point for the corresponding zone;

means for determining how many zones are calling for heating and how many are calling for cooling; and means for placing all of said terminal means in either a direct acting or reverse acting mode in accordance with whether most of the zones are calling for cooling or heating, respectively.

14. An air distribution system for controlling the supply of conditioned air to a plurality of zones comprising:

air distribution means;

air handler means for supplying conditioned air to said air distribution means;

a plurality of air terminal means operatively connected to said air distribution means for controlling the flow of conditioned air into a plurality of zones;

said air terminal means in each zone including:

means for sensing the temperature in each zone;

means for setting the set points for each zone; and means for controlling each of said terminals responsive to the difference between the sensed temperature in each zone and the set point for the corresponding zone:

means for controlling said air handler means responsive to said differences between the sensed temperature in each zone and the set point for the corresponding zone;

means for determining how many of said terminals are dissatisfied which is defined as being outside of a dead band centered on the set point for the mode of operation when all of said terminals are acting in the same mode; and means for causing said means for controlling said air handler means to operate to maintain the number of dissatisfied terminals within a predetermined range.

15. An air distribution system for controlling the supply of conditioned air to a plurality of zones comprising:

air distribution means;

air handler means for supplying conditioned air to said air distribution means;

a plurality of air terminal means operatively connected to said air distribution means for controlling the flow of conditioned air into a plurality of zones;

said air terminal means in each zone including:

means for sensing the temperature in each zone;

means for setting the set points for each zone; and means for controlling each of said terminals responsive to dissatisfaction which is defined by the difference between the sensed temperature in each zone and the set point for the corresponding zone;

means for controlling said air handler means responsive to said differences between the sensed temperature in each zone and the set point for the corresponding zone.

16. The air distribution system of claim 15 further comprising means for resetting the temperature of the supply air.

* * * * *